United States Patent Office

2,836,572
Patented May 27, 1958

2,836,572

VINYL RESIN CONTAINING POLYNITROSO DIURETHANE BLOWING AGENT AND METHOD OF BLOWING

Lawrence Clark and Algirdas C. Poshkus, Lancaster, Pa., assignors to Armstrong Cork Company, Lancaster, Pa., a corporation of Pennsylvania No Drawing. Application May 18, 1955
Serial No. 509,401

8 Claims. (Cl. 260—2.5)

This invention relates generally to cellular products, and more particularly to cellular products produced by means of a heat decomposable blowing agent. Still more particularly, it relates to cellular products wherein the cell formation has been accomplished by the decomposition of a nitrosated polyurethane having at least one secondary amine group.

Prior work on blowing agents has produced many compounds suitable for the blowing of polymeric materials useful for a wide variety of purposes. Generally speaking, known blowing agents are either inorganic or organic compounds which decompose on heating to liberate one or more gases.

Among the known blowing agents are compounds which may be generically identified as N,N'-dinitroso diurethanes; exemplary of such compounds is tetramethylene dinitroso-dimethyl urethane. This latter class of blowing agents is distinguished by the formation of both carbon dioxide and nitrogen during the composition. Since these compounds are readily soluble in most plastics, and since they yield uniform cell distribution on heating, they have been very useful. However, the compounds suffer from one serious disadvantage. When these compounds are used with light-colored high polymers, for example, polyvinyl chloride and vinyl chloride copolymers, they discolor the final cellular product. Although such discoloration may well not be a disadvantage in many applications, it would be highly advantageous if the excellent results of such compounds could be retained while the discoloration tendency was eliminated.

It is the primary object of the present invention to present such a blowing agent. It is another object of the present invention to provide a class of N,N'-substituted polynitroso diurethanes which will yield cellular products of uniform cell structure, good texture, closed cells, and without any attendant discoloration.

To this end, the invention contemplates admixing an N,N'-substituted polynitroso diurethane containing at least one secondary amine group in a high polymeric synthetic plastic, preferably comprising polymeric vinyl chloride. The mixture is then heated to a temperature above the decomposition point of the diurethane.

The distinction between the blowing agents of the present invention and known N,N'-dinitroso diurethane blowing agents lies in the presence of at least one secondary amine group in the molecule. The known blowing agents contain the nitroso carbamide group

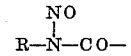

in the molecule one or more times. It should be noted that the nitrogen in the chain (other than that in the nitroso group) is amidic in nature. In fact, in all the previously described diurethane blowing agents, the nitrogen attached to a carbon is always amidic in nature.

The compounds of the present invention, while possessing nitrogen attached to a carbon of amidic nature, must also contain a nitrogen which is aminic in nature. This aminic nitrogen apparently accounts for the lack of discoloration in the final cellular product.

The compounds contemplated by the present invention may be expressed by the generic formula:

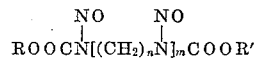

where R and R' are the same or different and stand for an alkyl group containing 1 to 4 carbon atoms, $n$ is a whole number from 2 to 3 inclusive, and $m$ is a whole number at least equal to 2. As examples of such compounds, there may be cited

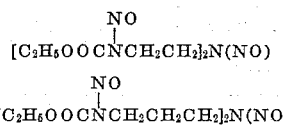

Such compounds may have substituents replacing the hydrogen in the bracketed groups.

The above-described compounds are easily prepared, since the intermediate polyamines are readily available commercially. Since an aminic group is mandatory in the final compound, the starting compound should be at least a triamine. The triamine may be reacted in known fashion with the chloro-formic esters, such as the chloroformic ethyl ester in a suitable solvent maintained in an alkaline condition. The resulting aminic diurethane may be nitrosated in the usual way, as for example by the addition of sodium nitrite and hydrochloric acid. Although theoretically all the hydrogen attached to nitrogen in the compound should be replaced by —NO groups, there is strong evidence to suggest that this is not completely true. Analytical methods which include analysis of the total gases evolved by the new blowing agent on heating, and also chemical tests for nitroso groups, indicate that the final compound is incompletely nitrosated. This appears to be true with both the prior urethane blowing agents and with the present amine group-containing urethane blowing agents. It has not been possible to determine the position of the nitroso group in the molecule, but it is postulated that the nitroso groups would preferentially react with the amidic hydrogen before reacting with the aminic hydrogen. Thus, it must be recognized that the amine group in the diurethanes of the present invention may or may not be nitrosated.

The blowing agents of the present invention are liquid substances, usually of a yellow or salmon color. The substances are readily soluble in many common solvents and show no disposition for detonation. In common with the prior diurethane blowing agents, they release both carbon dioxide and nitrogen during decomposition and yield harmless degradation products. Generally speaking, they are capable of expanding a given volume of resin about 20 times; this, however, is contingent on the amount of blowing agent to be incorporated in the resin.

The new blowing agents are incorporated in polymers and resins by known methods. Along with the blowing agents, there may be used fillers, plasticizers, accelerators, pigments, and other ingredients normally used in forming resinous products.

The amount of the new blowing agent to be added to the polymeric material may vary between about 0.5% and about 10% by weight of the total mixture. Preferably, however, the range is maintained between about 2–6% by weight. Although the new blowing agents may be advantageously utilized in such polymers as natural rubber, they are particularly useful in the synthetic plastics, as for example the high polymeric synthetic plastics comprising vinyl chloride polymers or copolymers. Use of the blowing agents in expanding polyvinyl chloride or its copolymers produces a particularly desirable product, although excellent results are also obtained in foaming polystyrenes, butadiene-styrene copolymers, and polyvinyl chloride-vinyl acetate copolymers such as the product designated as VYHH, which contains 13% vinyl acetate.

The temperature range at which the polymer-blowing agent mixture is to be blown will vary from about 200° F. to about 360° F., and preferably in the range of about 280° F. to about 320° F.

The internal temperatures of the material being expanded by the present blowing agents have been found to be lower than the internal temperatures of the same materials expanded under the same conditions wherein there is used the known diurethane blowing agents of the prior art. Measurements made with a thermocouple inserted into the material during expansion indicate that the blowing agent of the present invention allows an internal temperature of some 30°–50° F. reduction, as opposed to the internal temperature obtained when the prior diurethanes are used.

The following examples illustrate several embodiments of the invention:

EXAMPLE I

Preparation of $HN-(CH_2CH_2NHCOOC_2H_5)_2$

Chloroformic ethyl ester (432 grams; 4 moles) is added slowly and with cooling to a stirred solution of 206 grams (2 moles) diethylene triamine in 100 ml. of methylene dichloride. In order to maintain the solution basic at all times, a solution of 85 grams sodium hydroxide and 420 ml. of water is also added during the reaction.

At the end of the reaction, about 20 minutes after the reagents have been added to the mixture, the aqueous layer is extracted with methylene dichloride, the extract dried over magnesium sulfate, and the methylene dichloride distilled. The resulting crystals are dissolved in 150 ml. of benzene and precipitated by the addition of petroleum ether. The yield of the urethane, M. P. 63–6° C., amounts to 62%. The crystals obtained by slow evaporation of a solution in petroleum ether melt at 74–5° C. The urethane shows a great tendency to form gels or imbibe large quantities of solvent, making crystallization rather difficult.

EXAMPLE II

The diurethane of diethylene triamine prepared as in Example I (158 grams; 0.64 mole), 241 ml. of concentrated hydrochloric acid, and 150 ml. methylene dichloride were slowly treated while stirring with 112 grams sodium nitrate in 220 ml. of water. The temperature was kept below 5° C. After about one-half hour, the organic layer was removed, the aqueous layer washed with methylene dichloride, and the combined extracts washed three times with water, two times with 3% sodium hydroxide, again three times with water, and finally dried over magnesium sulfate. Evaporation of methylene dichloride left 144 grams of a salmon-colored oil. One gram of this oil produced 170 ml. of gas on decomposition at 147° C. The $CO_2$ to $N_2$ ratio was 0.81. The product had 4.45 milliequivalents NO per gram of material by analysis with sulfonic acid, as compared with the theoretical value of 9 milliequivalents.

EXAMPLE III

In another preparation, 54.8 grams (0.2 mole) of the diurethane prepared as in Example I was dissolved in 100 ml. of acetic acid and 90 ml. of concentrated hydrochloric acid. The solution was cooled to about 0° C. and a saturated aqueous solution of 56 grams (0.8 mole) sodium nitrite slowly added with stirring. An oil slowly came out. The material was stirred over a period of 1½ hours and the temperature was allowed to rise to about 15° C. The oil was extracted with methylene dichloride, the extracts washed three times with water, two times with dilute sodium bicarbonate solution, and then four times with water. The extracts were dried over magnesium sulfate at 0° C. Evaporation of the solvent left 50 grams of a salmon-colored oil. One gram of this oil gave 180 ml. of gas. The product had 4.90 milliequivalents per gram of material (analysis per NO with sulfonic acid). Theoretical value for the trinitroso compound is 9 milliequivalents.

EXAMPLE IV

The process of Example I was repeated using chloroformic ethyl ester and dipropylene triamine to form the compound $NH(-CH_2CH_2CH_2NHCOOC_2H_3)_2$. The product could not be obtained crystalline but instead was a viscous oil.

The product was nitrosated as in Example II.

EXAMPLE V

A mixture of 100 grams VYHH resin, 12.5 grams Hycar OR-25 (butadiene-acrylonitrile copolymer containing about 33% acrylonitrile), 10 grams Paraplex G-60 (polymeric type plasticizer), and 5.6 grams of the compound prepared in Example II was milled on a 220° F. mill and then ground on a Fritz mill. The mix was then expended in a 300° F. oven to obtain a cellular product having a density of 7½ pounds per cubic foot and having a very light cream color. The maximum internal temperature recorded during expansion was 310° F.

EXAMPLE VI

Example V was repeated, except that there was used 5.6 grams of the nitrosated diurethane of ethylene diamine. The maximum internal temperature was 350° F. and the color of the cellular product was a light brown, with a core having a slightly darker color. This foam was markedly inferior to that in Example V.

EXAMPLE VII

A mix of 100 grams of VYHH resin, 12.5 grams Hycar OR-25, 10 grams Paraplex G-60, and 6.4 grams of the nitrosated compound prepared as in Example IV was milled as in Example V, and expanded in a 300° F. oven. The maximum internal temperature recorded was 300° F. The density of the foam was 9½ pounds per cubic foot. The color of the cellular product was a scarcely detectable very pale cream.

We claim:

1. The process of forming cellular products which comprises admixing a diurethane having the formula

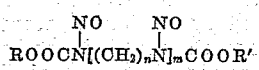

wherein R and R' are alkyl radicals containing from 1 to 4 carbon atoms, $n$ is a whole number from 2 to 3 inclusive, and $m$ is a whole number at least equal to 2, with a polymerized vinyl chloride, and heating said mixture to a temperature above the decomposition point of said N-nitrosoaminic urethane.

2. The process according to claim 1 wherein said N-nitrosoaminic urethane is present in an amount ranging from about 0.5% to about 10% by weight.

3. The process according to claim 1 wherein said polymerized vinyl chloride is polyvinyl chloride.

4. The process according to claim 1 wherein said polymerized vinyl chloride is a vinyl chloride-vinyl acetate copolymer.

5. The process of forming cellular products which comprises admixing a diurethane having the formula

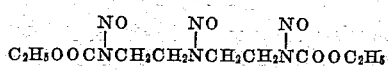

with a high polymeric synthetic plastic comprising polymeric vinyl chloride, and heating said mixture to a temperature above the decomposition point of said diurethane.

6. A polymeric composition formed from polyvinyl chloride and containing as a blowing agent a compound having the formula

7. A polymeric composition formed from polyvinyl chloride and containing as a blowing agent a compound having the formula

8. A high polymeric synthetic plastic comprising polymeric vinyl chloride and containing as a blowing agent an N,N'-substituted polynitroso diurethane having the formula

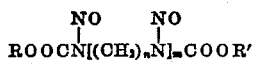

wherein R and R' are alkyl radicals containing from 1 to 4 carbon atoms, $n$ is a whole number from 2 to 3 inclusive, and $m$ is a whole number at least equal to 2.

References Cited in the file of this patent

UNITED STATES PATENTS 2,683,696  Muller et al. _____ July 13, 1954

UNITED STATES PATENT OFFICE

CERTIFICATE OF CORRECTION

Patent No. 2,836,572

May 27, 1958

Lawrence Clark et al.

It is hereby certified that error appears in the printed specification of the above numbered patent requiring correction and that the said Letters Patent should read as corrected below.

Column 3, line 49, for "nitrate" read -- nitrite --; column 4, line 23, for "expended" read -- expanded --.

Signed and sealed this 22nd day of July 1958.

(SEAL)

Attest:

KARL H. AXLINE
Attesting Officer

ROBERT C. WATSON
Commissioner of Patents